(No Model.)
A. O. FRICK.
TRACTION ENGINE.
No. 256,993. Patented Apr. 25, 1882.
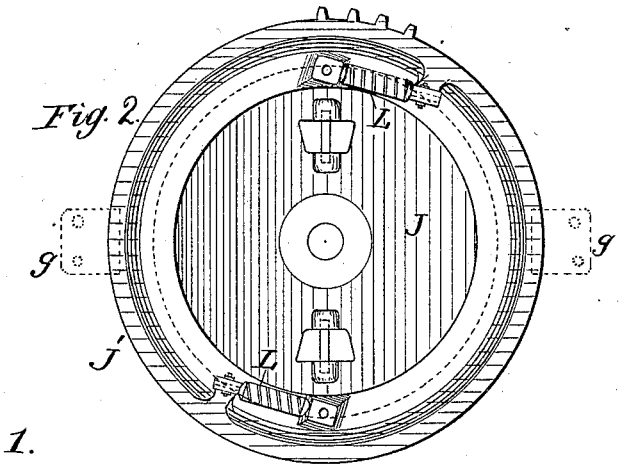
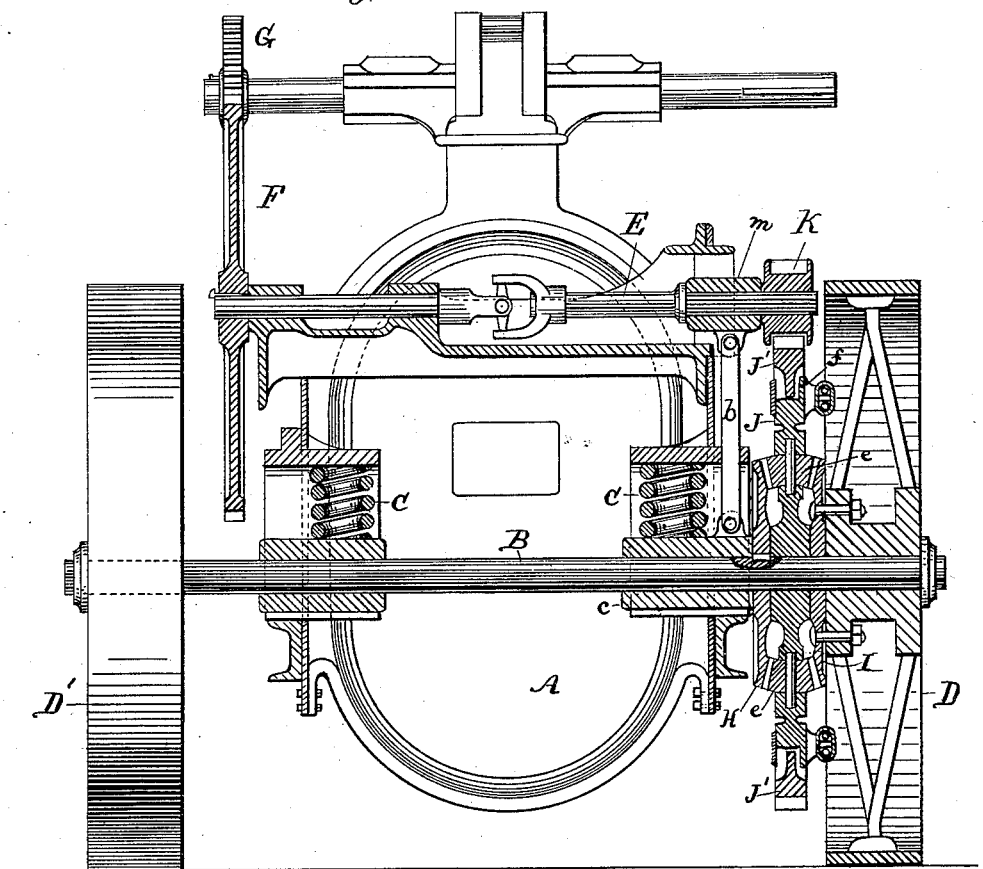
WITNESSES:
Thos. Houghton.
Edw. W. Byrn.
INVENTOR:
A. O. Frick
BY
ATTORNEYS.

UNITED STATES PATENT OFFICE.

ABRAHAM O. FRICK, OF WAYNESBOROUGH, PENNSYLVANIA.

TRACTION-ENGINE.

SPECIFICATION forming part of Letters Patent No. 256,993, dated April 25, 1882.

Application filed March 7, 1882. (No model.)

*To all whom it may concern:*

Be it known that I, ABRAHAM O. FRICK, of Waynesborough, in the county of Franklin and State of Pennsylvania, have invented a new and Improved Traction-Engine; and I do hereby declare that the following is a full, clear, and exact description of the same, reference being had to the accompanying drawings, forming part of this specification, in which—

Figure 1 is a vertical transverse section taken through the traction-wheels at the rear end of the engine. Fig. 2 is a side view of the compound wheel.

My invention relates to an improvement in traction-engines.

It has for its object the attainment of the same results aimed at by me in another construction, for which I have applied for Letters Patent of even date herewith, and marked "Case A." In short, these results are the adaptation of this class of engines to successful use under the varying strains to which they are subjected when passing uneven earth roads.

The invention consists in the peculiar connection of the counter-shaft to the axle by means of a compound gear-wheel having a laterally-flexible rim, as will be better understood with reference to the drawings.

A is the body of the engine, and B is the axle, which through springs C sustains the weight of the engine.

D D' are the two traction-wheels, one of which, D, is loose on the axle and the other of which, D', is rigidly connected therewith.

E is the counter-shaft, which at one end is provided with a gear-wheel, F, that receives motion from a pinion, G, on the crank-shaft, and at the other end has a pinion, K, that engages with a wheel, J J', on the axle. This counter-shaft is made at one end capable of movement at right angles to its axis, and its box *m* is made movable vertically, and is connected by a link, *b*, with the box *c* of the main axle, which is also made movable in guides.

H I J *e* is a compensating-gear, of which H is a bevel-wheel which is keyed on the axle, and I a bevel-wheel loose on the axle, but bolted to the traction-wheel D; and J is an intermediate wheel loose on the axle, and provided with bevel-pinions *e*, whose axes lie in the plane of the wheel J. This compensating-gear serves to transmit motion to either one or both of the traction-wheels, and enables the two wheels to have an independent motion in turning.

As so far described, my invention does not differ substantially from my other construction as embodied in Case A. As fully described in that application, there is a tendency in the pinion K and the gear-wheel J J' to move into different planes whenever either end of the axle is lifted by an obstruction or is higher than the other. I provide for this in my said other application by making the counter-shaft to slide longitudinally and connecting the gear-wheel on the axle and the pinion K by teeth that are not capable of separation laterally, so that the lateral movement of the wheel on the axle drags pinion K with it and moves the counter-shaft longitudinally.

In the present invention the adjustability of the counter-shaft at right angles to its axis is preserved, and may be utilized either by the arrangement shown in my other case or by a universal joint, as shown here. Instead, however, of making the counter-shaft to slide longitudinally, I provide the wheel J with a laterally-flexible rim of teeth, J'. This rim occupies a position in a wide peripheral groove, *f*, on the part J of the wheel, the width of which groove is sufficient to take up the lateral play of the rim J', and the bottom of which groove is made crowning or convex. The rotary strain is imparted from the pinion K to the toothed rim J', and thence is transmitted to the part J of this compound wheel through the springs L L, Fig. 2, which are of the construction described in my other application and serve to drive the engine either backward or forward. These springs, it will be seen, are fastened at one end to the rim J' and at the other end to the inner or web portion, J, of the compound wheel, and they serve a twofold purpose: first, of permitting the lateral flexibility of the rim or tire to compensate for variations in the plane of the two gear-wheels, which avoids the breaking strain involved from the pitching of the engine from side to side; and, secondly, of imparting a rotary elastic strain from the engine to both the traction-wheels.

Instead of making the web portion J of the compound wheel with a peripheral groove to guide the rim portion in its oscillation and hold it always in the plane of the pinion, independent guides g g may be connected to the stationary part of the side frame of the engine and made to lap over the edge of the rim J, as shown in Fig. 2 in dotted lines.

Instead of the springs L, links or other form of draft-connections may be used.

Having thus described my invention, what I claim as new is—

1. The combination, with a driving gear-wheel, K, and the axle, of a compound wheel arranged upon the axle and having a laterally-flexible toothed rim and draft-connection between said toothed rim and the inner or web portion, substantially as shown and described.

2. The combination, with the body of the engine and the axle having springs interposed between the same, of a counter-shaft located above the axle and having a universal joint in the same, with a pinion, K, a movable bearing for the counter-shaft connected to the axle by a link, and a compound wheel located on the axle and provided with a laterally-flexible toothed rim, substantially as shown and described.

3. The combination, with the compensating-gears H I J e, of a laterally-flexible toothed rim and draft-connections between the rim and its web portion J, as described.

The above specification of my invention signed by me in the presence of two subscribing witnesses.

ABRAHAM O. FRICK.

Witnesses:
 EDW. W. BYRN,
 SOLON C. KEMON.